US008709241B2

United States Patent
Dopslaff et al.

(10) Patent No.: US 8,709,241 B2
(45) Date of Patent: Apr. 29, 2014

(54) RETROFITTABLE CONTROL UNIT FOR A SOFTENING APPARATUS

(75) Inventors: Carsten Dopslaff, Winnenden (DE); Ralf Soecknick, Kornwestheim (DE); Klaus Neidhardt, Grosserlach (DE); Alexander Haug, Remseck (DE); Siegfried Melcher, Oberstenfeld (DE)

(73) Assignee: Judo Wasseraufbereitung GmbH, Winnenden (DE)

( * ) Notice: Subject to any disclaimer, the term of this patent is extended or adjusted under 35 U.S.C. 154(b) by 302 days.

(21) Appl. No.: 13/058,187

(22) PCT Filed: Jul. 9, 2009

(86) PCT No.: PCT/DE2009/000957
§ 371 (c)(1),
(2), (4) Date: Feb. 8, 2011

(87) PCT Pub. No.: WO2010/017792
PCT Pub. Date: Feb. 18, 2010

(65) Prior Publication Data
US 2011/0132818 A1 Jun. 9, 2011

(30) Foreign Application Priority Data
Aug. 9, 2008 (DE) .................. 10 2008 037 229

(51) Int. Cl.
*B01J 49/00* (2006.01)
*B01D 35/00* (2006.01)
*B01D 15/00* (2006.01)

(52) U.S. Cl.
USPC ............ 210/96.1; 210/101; 210/87; 210/143; 210/269; 210/93; 210/264; 210/105

(58) Field of Classification Search
None
See application file for complete search history.

(56) References Cited

U.S. PATENT DOCUMENTS

| | | | | |
|---|---|---|---|---|
| 3,676,336 A | * | 7/1972 | O'Brien et al. | 210/662 |
| 4,158,628 A | * | 6/1979 | Fleckensteim | 210/85 |
| 4,275,448 A | * | 6/1981 | Le Dall | 700/271 |
| 4,295,863 A | * | 10/1981 | Lattuada | 95/19 |
| 5,069,779 A | * | 12/1991 | Brown et al. | 210/87 |
| 5,157,979 A | | 10/1992 | Brane et al. | |
| 6,347,644 B1 | * | 2/2002 | Channell | 137/597 |

(Continued)

FOREIGN PATENT DOCUMENTS

| CN | 2181498 Y | 11/1994 |
|---|---|---|
| EP | 0900765 A2 | 10/1999 |

(Continued)

*Primary Examiner* — Nam Nguyen
*Assistant Examiner* — Richard Gurtowski
(74) *Attorney, Agent, or Firm* — Hackler Daghighian & Martino

(57) ABSTRACT

A control unit for a softening device, comprising a primary inlet for untreated water, a primary outlet for blended water, a sensor for determining the water hardness of the untreated water $WH_{raw}$, or the blended water $WH_{blend}$, a secondary outlet, a secondary inlet, a bypass line, a blending means which can be automatically adjusted for mixing a blended water flow $V_{blend}(t)$ from a first partial flow $(V(t)_{part1soft}$ of the secondary inlet and a second partial flow $V(t)_{part2raw}$ of the bypass line, and an electronic control means, wherein the control means is designed to readjust the adjustment position of the blending means by means of the determined water hardness in such a fashion that the water hardness in the blended water flow $V_{blend}(t)$ is adjusted to a predetermined desired value, enables partial softening of water on the basis of fully automatic blending, thereby utilizing already existing softening devices.

17 Claims, 2 Drawing Sheets

(56) References Cited

U.S. PATENT DOCUMENTS

| | | | |
|---|---|---|---|
| 2003/0132164 A1* | 7/2003 | FitzGerald et al. | 210/670 |
| 2007/0144953 A1 | 6/2007 | Rivi | |
| 2007/0205145 A1* | 9/2007 | Carnell | 210/190 |
| 2007/0215531 A1* | 9/2007 | Wawrla et al. | 210/101 |

FOREIGN PATENT DOCUMENTS

| | | |
|---|---|---|
| GB | 597521 | 1/1948 |
| JP | S63-130599 A | 6/1988 |
| JP | H1-151897 A | 6/1989 |
| JP | H3-202190 A | 9/1991 |
| JP | H08-089955 | 4/1996 |
| JP | H10-15653 A | 1/1998 |
| JP | H10-177019 | 6/1998 |
| JP | 2000-61462 A | 2/2000 |
| JP | 2001-050869 | 2/2001 |
| JP | 2001-0137846 | 5/2001 |
| JP | 2003-001250 A | 1/2003 |
| JP | 2003-019480 | 1/2003 |
| JP | 2003019480 | 1/2003 |
| JP | 2003-190950 | 7/2003 |
| JP | 2010-536320 A | 11/2010 |
| JP | 2011-505243 A1 | 2/2011 |
| RU | 2246448 C1 | 2/2005 |
| RU | 2323893 C1 | 5/2008 |
| WO | 2006-049916 A1 | 5/2006 |
| WO | WO 2009/071066 A2 | 6/2009 |

* cited by examiner

RETROFITTABLE CONTROL UNIT FOR A SOFTENING APPARATUS

The invention relates to a control unit for a softening device, the control unit comprising
- a primary inlet for untreated water,
- a primary outlet for blended water,
- a sensor for determining the water hardness of the untreated water $WH_{raw}$ or of the blended water $WH_{blend}$,
- a secondary outlet which is supplied with untreated water from the primary inlet,
- a secondary inlet which is supplied to the primary outlet,
- a bypass line which is guided parallel to the secondary outlet and the secondary inlet,
- a blending means which can be automatically adjusted for blending a blended water flow $V_{blend}(t)$ from a first partial flow $V(t)_{part1soft}$ of the secondary inlet and a second partial flow $V(t)_{part2raw}$ of the bypass line,
- an electronic control means, wherein the control means is designed to readjust the adjustment position of the blending means by means of the determined water hardness $WH_{raw}$ or $WH_{blend}$ in such a fashion that the water hardness in the blended water flow $V_{blend}(t)$ is adjusted to a predetermined desired value.

A water softening system comprising a control unit of this type is disclosed in EP 0 900 765 B1.

Water is softened anywhere where the usual supply systems (e.g. the drinking water network) only provide relatively hard water but softer water is desired for technical or comfort reasons.

Water is softened using softening devices, most of which work according to the ion exchange method. The hardness components (calcium and magnesium ions) that are contained in the water are thereby exchanged with sodium ions in an ion exchange resin. When the ion exchange resin is depleted it must be regenerated e.g. by rinsing it with brine.

In simple water softening systems, the softening device is serially connected upstream of a water installation such that the subsequent water installation is provided with fully softened water.

However, for technical or economical reasons, it is often necessary or desired to use only partially softened water. Fully softened water can cause problems with corrosion when the formation of a protective layer in the downstream piping system is no longer possible. Moreover, complete softening rapidly exceeds the capacity of the softening device and premature regeneration is necessary which is accompanied by high salt consumption and therefore high costs.

Partially softened water is conventionally provided by splitting an incoming untreated water flow, subjecting a first partial flow to a full softening process (soft water partial flow) and leaving a second partial flow untreated (untreated water partial flow, also bypass partial flow). The two partial flows are subsequently joined (so-called blending). The joined water flow is usually called blended water flow. The blended water flow is then guided into the downstream water installation.

Simple water softening systems that include blending provide a fixed or also manually adjustable ratio between the first and the second partial flow. This ratio is adjusted to the local untreated water hardness and the desired blended water hardness.

These simple water softening systems that include blending are disadvantageous in that e.g. a fluctuating untreated water hardness, which is due to seasonal reasons, produces a fluctuating blended water hardness. This fluctuation is usually accepted. When the fluctuating untreated water hardness is detected, the ratio between the first and the second partial flow may also be manually readjusted.

Water softening systems with fully automated blending have also been recently disclosed, see EP 0 900 765 B1. The hardness of the incoming untreated water is determined by a conductivity sensor, and a ratio between the partial flows, which is determined by two flow meters, is readjusted via an automatically adjustable valve in dependence on the untreated water hardness.

The conventional water softening systems with automatic blending are disadvantageous mainly due to the high costs associated with such a system. The conventional systems are extremely complex integrated devices which completely replace any previously installed, simple (non-automatic) water softening systems without blending, or also softening systems with fixed or manually adjustable blending.

OBJECT OF THE INVENTION

It is the object of the present invention to enable partial softening of water on the basis of fully automatic blending using already existing softening devices, thereby reducing the effort and the costs for providing fully automatic blending.

SUMMARY OF THE INVENTION

This object is achieved by a control unit of the above-mentioned type which is characterized in that the control unit is designed in the form of an external control unit for the softening device, wherein the control unit has a control unit housing the outer side of which is provided with the primary inlet, the primary outlet, the secondary outlet and the secondary inlet, and wherein the control unit housing contains the sensor, the bypass line, the blending means and the electronic control means.

The inventive control unit unites all components that are required for automatic blending in the control unit housing, in particular, a separate bypass line. The primary inlet of the control unit may be connected to the public water supply system (e.g. a public drinking water pipeline), which supplies via the primary outlet a downstream water installation such as e.g. the drinking water network inside a building. A softening device is connected to the secondary outlet and the secondary inlet, which generally produces soft water from the entire untreated water supplied to it. The inventive control unit itself detects all data required for automatically readjusting the blending means by means of its sensor (if necessary supplemented by at least two flow meters for determining the partial flows $V(t)_{part1soft}$ and $V(t)_{part2raw}$). When the sensor is disposed in the blended water area, the blended water hardness can be directly determined and readjusted, and flow meters are not required for readjusting the blended water hardness. When the sensor is disposed in the untreated water area, which simplifies the measurement of the hardness, the blended water hardness can be indirectly determined and readjusted via the partial flows $V(t)_{part1soft}$ and $V(t)_{part2raw}$ determined by two flow meters. Rough control of the blending means merely by means of the untreated water hardness is possible without determining the partial flows $V(t)_{part1soft}$ and $V(t)_{part2raw}$. In this case, the flow meters can also be omitted. The control unit can, in particular, be automatically adjusted to the instantaneous water hardness and compensate for fluctuations in the untreated water quality such that the blended water hardness at the primary outlet is kept constant.

The control unit is connected to the softening device via the secondary outlet and the secondary inlet. The control unit does not require any data from the softening device or other external sensors. For this reason, the inventive control unit can cooperate with basically any type of softening device. Moreover, balancing and adjustment works with respect to the utilized softening device are not necessary such that after installation (i.e. connecting the primary inlet, primary outlet, secondary inlet and secondary outlet), the ensemble of control unit and softening device can be immediately used ("plug and play").

In particular, already existing simple water softening systems can be used as softening devices, which themselves have no control function or a control function that is experienced as being insufficient. As an alternative, the control unit can also cooperate with a new softening device. When the connected softening device itself has a (simple) control function, it is replaced by the control function of the inventive control unit. Any blending within the connected softening device should be disabled (i.e. the bypass within the device is closed such that the connected softening device produces pure soft water).

The present invention therefore provides a universal control unit for the softening device, which is separate from a softening device to be connected and therefore external to the softening device. The control unit gathers all data for regulating its blending means by itself and can therefore provide a constant blended water quality in a simple fashion. The control unit housing "terminates", in particular, at the secondary inlet and secondary outlet and does, in particular, not contain the softening device which contributes to the universality of the inventive control unit.

In accordance with the invention, the predetermined desired value of the blended water hardness may be one single desired hardness value or also a desired hardness value interval, wherein when this value changes, the adjustment position of the blending means is readjusted.

It should be noted that the regulation mechanism of the blending means may be based on the untreated water hardness (in this case the instantaneous blended water hardness is obtained from the instantaneous ratio between the instantaneous partial flows $V(t)_{part1soft}$ and $V(t)_{part2raw}$; the partial flows $V(t)_{part1soft}$ and $V(t)_{part2raw}$ can be experimentally exactly determined via flow meters or be estimated by means of the adjustment position of the blending means) and also on the blended water hardness (which is then directly compared to the desired value of the blended water hardness). The partial flows can be directly determined with flow meters in the respective partial flow (direct determination) or via differencing of a certain overall flow with (in general) a determined partial flow (indirect determination).

PREFERRED EMBODIMENTS OF THE INVENTION

In one particularly preferred embodiment of the inventive control unit, the sensor is designed as a conductivity sensor. The water hardness is determined on the basis of the conductivity by means of mathematical calculation or reading out a table, typically in the electronic control unit. Conductivity sensors for determining the water hardness are inexpensive and reliable. The sensor may alternatively be designed e.g. as a titrator or an ion-selective electrode.

In another preferred embodiment, the sensor is disposed in the untreated water area of the control unit. The sensor may e.g. be disposed in the bypass line or directly downstream of the primary inlet. The sensor is then used for direct determination of the untreated water hardness $WH_{raw}$. The untreated water hardness can be used for determining a desired ratio between the first and the second partial flow to obtain the desired water hardness value in the blended water. This desired ratio can be readjusted by means of the monitored partial flows. It is also useful to know the untreated water hardness in order to determine a residual capacity of the softening device for automatic regeneration control. The sensor may alternatively be arranged in the blended water. A defined blended water hardness can then be directly compared to the desired value in order to readjust the adjustment position of the blending means. In case the untreated water hardness is required, this value can be indirectly calculated back via the blended water hardness and the associated instantaneous partial flow ratio (assuming that a connected softening device performs complete softening).

In one particularly preferred embodiment, the control unit housing is designed as an intermediate connecting piece. This enables simple and space-saving installation which is particularly suited for retrofitting.

Another preferred embodiment is characterized in that the control unit furthermore comprises at least two flow meters for direct or indirect determination of the partial flows $V(t)_{part1soft}$ and $V(t)_{part2raw}$, the electronic control means is designed to readjust the adjustment position of the blending means also using the defined partial flows $V(t)_{part1soft}$ and $V(t)_{part2raw}$, and that control unit housing also contains the at least two flow meters. In this case, the blended water hardness can be determined and readjusted with high precision by means of the measured untreated water hardness and the defined partial flows. The hardness of the untreated water can be reliably and inexpensively determined via a conductivity sensor.

In another preferred embodiment, a first flow meter is disposed between the primary inlet and the branching point of the bypass line for determining an overall untreated water inflow $V(t)_{rawall}$, and a second flow meter is arranged in the bypass line for determining the second partial flow $V(t)_{part2raw}$. This construction has proven itself in practice. The first flow meter can, in particular, easily detect diverse untypical flow conditions.

In a preferred further development of this embodiment, the control unit has a measurement input for a third flow meter by means of which a rinsing water flow $V(t)_{part3rinse}$ can be determined for the electronic control means, and the electronic control means is designed to determine the first partial flow $V(t)_{part1soft}$ in accordance with the equation $V(t)_{part1soft}=V(t)_{rawall}-V(t)_{part2raw}-V(t)_{part3rinse}$. The determination of the third partial flow increases the accuracy of the blending control with indirect determination of a partial flow. The third flow meter is typically placed outside of the control unit housing and issues signals to the measurement input which is then located on the outer side of the control unit housing, In an alternative fashion, the third flow meter may also be disposed within the control unit housing. In this case, part of the control unit must have a rinsing water inlet and a rinsing water outlet and the measurement input can then be located directly on the electronic control means. It should be noted that multi-chamber softening devices enable removal of blended water and rinsing of the softening device at the same time.

In an advantageous embodiment, a measuring means is arranged, in addition to the sensor, in the blended water area for determining the concentration of the hardness components calcium and magnesium $C_{hardnessblend}$ in the blended water flow $V(t)_{blend}$. The measuring means provides additional control and, if required, readjustment of blending, in particular, when the sensor is disposed in the untreated water area.

In a further development of this embodiment, the measuring means is designed as a titrator for titrimetric determination of the hardness components. In an alternative fashion, the measuring means may comprise an ion-selective sensor, in particular, an ion-selective electrode.

In one particularly preferred embodiment, an automatically actuatable stop valve is disposed directly downstream of the primary inlet and the electronic control means is designed to automatically close the stop valve in case of leakage. A leakage (at the control unit, a connected softening device and/or in the downstream water installation) can be determined via humidity sensors and/or (preferably) via untypical flow conditions, determined from the measured values of the flow meters. Untypical flow conditions include e.g. very large absolute flows (large leakage, "pipe burst") or long lasting constant small flows (small leakage with otherwise closed fittings, "dripping water tap").

Embodiments Concerning Regeneration of the Softening Device

One particularly preferred embodiment of the inventive control unit is characterized in that the control unit has a control terminal for triggering regeneration of the softening device, and that the electronic control means is designed to determine a residual capacity of the softening device in dependence on the soft water withdrawals performed since the last triggered regeneration and on one or more associated defined untreated water hardnesses, and in case of depletion thereof, to automatically emit a control pulse to the control terminal for triggering regeneration. The control unit of this embodiment can additionally automatically control regeneration of the softening device that typically contains an ion exchange resin.

The basic capacity of the softening device is typically assumed to be always the same after each regeneration, and can be converted on the basis of a basic untreated water hardness into a defined soft water amount that can be generated. Within the scope of the present invention, the untreated water hardness that is to be taken as a basis is directly or indirectly empirically determined via the sensor. In the simplest case, the untreated water hardness is newly determined once after termination of one regeneration process (e.g. at the start of the first water withdrawal), and the amount of soft water that can be generated is correspondingly updated for the current operating cycle (=time between two regenerations). The update of the soft water amount may also be omitted for reasons of simplicity when the change in the newly determined untreated water hardness stays below a limiting value compared to the last basic untreated water hardness. Typical change limiting values, below which actualization of the water amount is omitted, are within a range of 0.5° dH to 2.0° dH.

In order to increase the accuracy of determination of the residual capacity, the different soft water withdrawals within one operating cycle can be weighted with the associated instantaneous untreated water hardnesses. It is thereby possible to use one single untreated water hardness that is determined at the start of each soft water withdrawal for the entire remaining water withdrawal in order to simplify the process without any noticeable loss in accuracy. The capacity used up with each water withdrawal reduces the remaining capacity (residual capacity) of the softening device in the current operating cycle. In an alternative fashion, capacity depletion can also be continuously detected using more complex mathematical methods (e.g. convolution methods) which also take into consideration changes in the untreated water hardness during one single water withdrawal.

In the simplest case, the untreated water hardness is determined directly in the untreated water area by means of a sensor. The untreated water hardness may also be determined from the instantaneous blended water hardness in connection with the instantaneous partial flows (in particular, their instantaneous ratio).

The basic capacity of the softening device (after one regeneration) is typically pre-programmed. When a measuring means or a sensor is provided in the blended water, the basic capacity can also be empirically determined (after installation of a softening device typically once). Towards this end, regeneration is triggered and untreated water of a known hardness is guided through the softening device until the concentration of Ca and Mg ions in the blended water rises again.

In a preferred further development of this embodiment, the sensor is designed as a conductivity sensor for measuring the conductivity of the untreated water $L_{raw}$, and the electronic control means is designed to derive an overall untreated water hardness I that is used to control regeneration triggering from the measured conductivity $L_{raw}$ by means of a first calibration characteristic (F1), and derive an overall untreated water hardness II that is used to control the blending means from the measured conductivity $L_{raw}$ by means of a second calibration characteristic (F2).

The accuracy of automatic blending and the accuracy and reliability (punctuality) of automatic regeneration triggering can be improved by using the two different calibration characteristics. The overall hardness I derived from the first calibration characteristic (F1) is preferably, at least in sections, larger than the overall hardness II derived from the second calibration characteristic (F2). The first calibration characteristic (F1) typically has a conversion factor of 28 to 35 µS/cm per ° dH, in particular 30 to 33 µS/cm per ° dH, and the second calibration characteristic (F2) typically has a conversion factor of 35 to 44 µS/cm per ° dH, in particular 38 to 41 µS/cm per ° dH.

Further Embodiments

In another preferred embodiment of the inventive control unit, the automatically adjustable blending means is designed in the form of a valve that can be adjusted by a servomotor. This has turned out to be useful in practice.

The invention also includes a water softening system comprising a softening device with a softener housing and an inventive external control unit, wherein the control unit is disposed outside of the softener housing and wherein the softening device is connected at the secondary outlet and secondary inlet of the control unit to the outer side of the control unit housing. The inventive water softening system can be formed in a fast and simple fashion from an inventive control unit and any water softening device. Softener housing and control unit housing are completely separate, i.e. neither is the softening device contained in the control unit housing nor is the control unit contained in the softener housing. Part of the softener housing can, however, be inserted into (project into) a recess of the control unit housing or vice versa.

A preferred embodiment of the inventive water softening system that comprises the above-described control unit with automatic regeneration triggering is characterized in that the water softening system has a supply container for regenerant solution and means for automatic performance of regeneration of the softening device, in particular, comprising a regeneration valve that can be driven by a servomotor, and that the control terminal is connected to the means for automatic performance of regeneration. This water softening system can also perform automatic regeneration of the softening device. The supply container and the means for automatic performance of regeneration of the softening device may be disposed within or outside of the softener housing; they are generally disposed outside of the control unit housing. As an alternative to a servomotor, an impeller drive may e.g. also be provided for a regeneration valve.

The present invention finally also includes the use of an inventive water softening system, wherein the softening device has its own blending means, and wherein the separate blending means of the softening device is closed such that the softening device only provides fully softened water. The inventive control unit takes over full control of blending within the scope of the present use. The separate (device-internal) blending means of the softening device is bridged. The separate blending means is typically not adjustable, only manually adjustable, or only adjustable with lower accuracy than the blending means of the inventive control unit.

Further advantages of the invention can be extracted from the description and the drawings. The features mentioned above and below may be used individually or collectively in arbitrary combination. The embodiments shown and described are not to be understood as exhaustive enumeration but have exemplary character for describing the invention.

BRIEF DESCRIPTION OF THE DRAWINGS

The invention is illustrated in the drawing and is explained in more detail with reference to embodiments.

DETAILED DESCRIPTION

Figure 1:
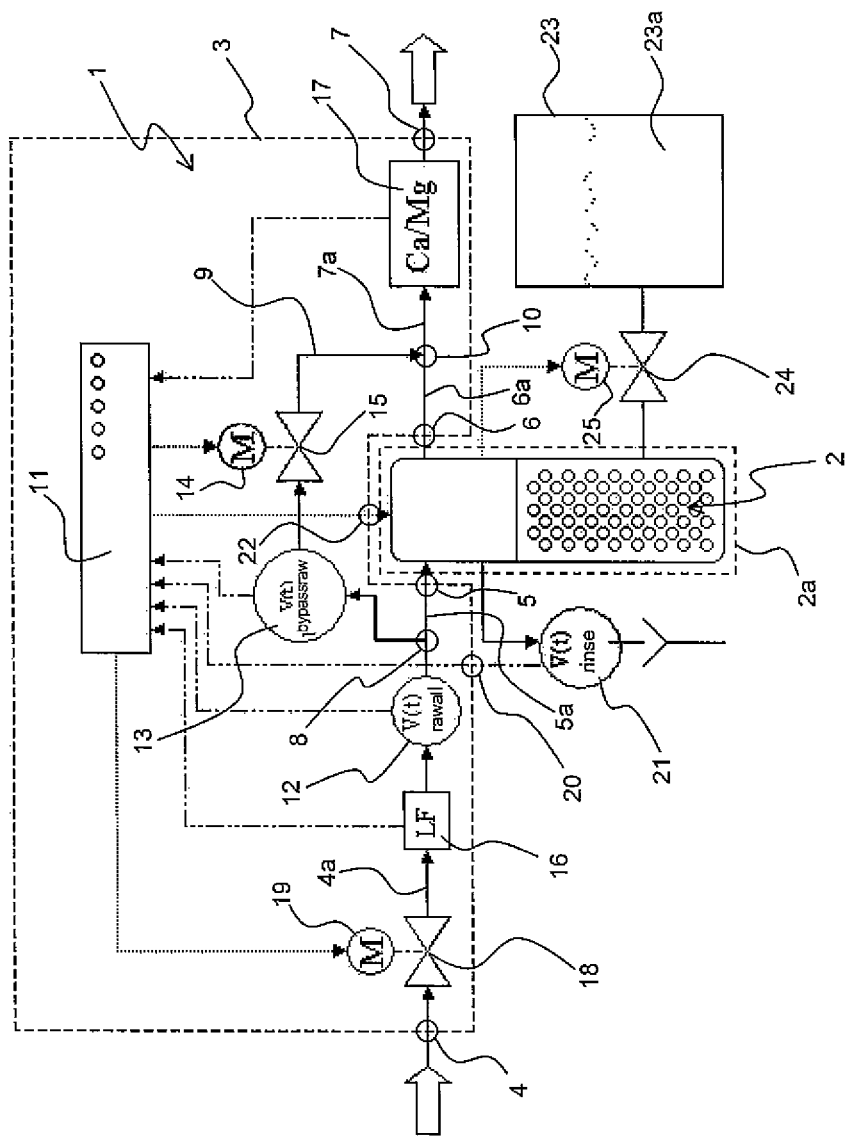
FIG. 1 shows a schematic view of an inventive water softening system with an inventive control unit, with a conductivity sensor in the untreated water area.

FIG. 1 shows a schematic view of an inventive control unit 1 which is connected to a softening device 2. The control unit 1 and softening device 2 together form substantially one inventive water softening system. It should be noted that the softening device 2 is shown greatly scaled down compared to the control unit 1.

The control unit 1 has its own control unit housing 3 on or in which all essential components of the control unit 1 are disposed. A primary inlet 4, a secondary outlet 5, a secondary inlet 6 and a primary outlet 7 are formed in the outer wall of the control unit housing 3. These connections are accessible from the outside and are provided with standardized flanges or the like.

The softening device 2 is connected to the secondary inlet 6 and the secondary outlet 5. In the illustrated embodiment, it has an ion exchange resin and has a separate softener housing 2a. The softener housing 2a partially projects into a recess of the control unit housing 3. However, the softening device 2 is disposed completely outside of the space surrounded by the outer wall of the control unit housing 3. The softening device 2 completely softens the untreated water that comes in via the secondary outlet 5 by means of the ion exchange resin, and supplies it as soft water to the secondary inlet 6. A separate blending means (not shown in detail) that is integrated in the softening device 2 and can only be manually adjusted is shut down by completely closing its bypass line such that any water that flows through the softening device 2 (except for the regeneration process) is completely softened by the ion exchange resin.

The primary inlet 4 is connected to a local water supply means (in the present case the drinking water network). An overall untreated water flow $V(t)_{rawall}$ flows through the primary inlet 4 to the control unit 1. A line section 4a that follows the primary inlet 4 leads to a branching point 8. The untreated water flow $V(t)_{rawall}$ is divided there into a first partial flow which flows via a line section 5a to the secondary outlet 5, and a second partial flow which flows through a bypass line 9 and is therefore also called $V(t)_{bypassraw}$ or $V(t)_{part2raw}$. The bypass line 9 leads from the branching point 8 to a joining point 10. A further line section 6a also leads from the secondary inlet 6 to the joining point 10. The first partial flow $V(t)_{part1soft}$, which is then softened by the softening device 2, and the second untreated water partial flow $V(t)_{part2raw}$ from the bypass line are joined at the joining point 10 to form a blended water flow $V(t)_{blend}$. A line section 7a finally leads from the joining point 10 to the primary outlet 7. A downstream water installation (not shown in detail) is connected to the primary outlet 7.

It should be noted that, for this reason, the line sections 4a and 5a and the bypass line 9 contain untreated water (untreated water area), and moreover the line section 6a contains soft water (soft water area) and the line section 7a contains blended water (blended water area).

In the illustrated embodiment, the control unit 1 has a sensor, namely a conductivity sensor 16 in the untreated water line section 4a, which emits measuring signals to an electronic control means 11. The measuring signals are converted into an untreated water hardness $WH_{raw}$ in the control means 11. From this value and based on a desired value, programmed in the control means 11, for a water hardness in the blended water flow $V(r)_{blend}$, a desired ratio between the two partial flows $V(t)_{part1soft}$ and $V(t)_{part2raw}$ is determined, which produces a water hardness in the blended water that corresponds to the desired value. When the desired value is e.g. 8° dH (dH=German hardness) and the untreated water hardness is 16° dH, one obtains a desired ratio between the first partial flow (the water hardness of which is assumed to be 0° dH) and the second partial flow (the water hardness of which corresponds to the untreated water hardness) of 1:1.

A first flow meter 12 is furthermore disposed in the line section 4a, which determines the entire untreated water flow $V(t)_{rawall}$ that is instantaneously flowing to the control unit 1. The bypass line 9 moreover has a second flow meter 13 which determines the instantaneous second partial flow $V(t)_{part2raw}$. Both flow meters pass their measurement results on to the electronic control means 11. The control means 11 indirectly determines from the instantaneous flow values at the flow meters 12 and 13 the instantaneous first partial flow $V(t)_{part1soft}$, which results (without rinsing flow, see below) from $V(t)_{part1soft} = V(t)_{rawall} - V(t)_{part2raw}$.

The control means 11 can then check by means of the indirectly determined first partial flow and the directly determined second partial flow whether the desired ratio of the partial currents is maintained at the moment. If not, it can trigger a change in the adjustment position of a valve 15 in the bypass line 9 and thereby a change in the second partial flow $V(t)_{part2raw}$ by means of a servomotor. This also changes the ratio between the second partial flow $V(t)_{part2raw}$ and the first partial flow $V(t)_{part1soft}$ in the blended water flow $V(t)_{blend}$. The adjustment position of the valve 15 can be quickly adjusted to the correct value using conventional methods such as e.g. PD or PID regulation, which value yields the desired ratio of the partial flows and thereby the desired blended water hardness.

The instantaneous untreated water hardness $WH_{raw}$ is permanently determined in the inventive control unit 11 and the instantaneous desired ratio of the partial flows is correspondingly adjusted. The adjustment position of the valve 15 is also permanently readjusted such that the actual ratio between the instantaneous partial flows corresponds to the instantaneous desired ratio and the predetermined desired water hardness in the blended water flow is always maintained.

In the illustrated embodiment, the line section 7a containing blended water moreover has a measuring means 17 that directly determines the concentration of the hardness components calcium and magnesium. In this case, the measuring means is provided for additional control of the blended water hardness and correspondingly passes its measuring results on to the electronic control means 11 which, if necessary, readjusts the automatically adjustable blending means in the form of the valve 15 that can be adjusted by the servomotor 14 on the basis of these measuring results.

A stop valve 18 is moreover provided in the line section 4a directly downstream of the primary inlet 4, which can be automatically actuated by the control means 11 via a servomotor 19. The control means 11 closes the stop valve when a leakage has been determined or communicated. In the illustrated embodiment, the control means 11 thereby detects, in particular, unusual flow conditions on the flow meter 12, e.g. very large flows or small but invariable flows which are in each case an indication of a leakage.

The inventive water softening system of the present embodiment also has a supply container 23 with a regenerant solution 23a for regenerating the ion exchange resin of the softening device 2, and means for automatic performance of regeneration. The softening device 2 in the present case has a regeneration function that can be triggered from case to case, and in the course of which, in particular, a regeneration valve 24 to the supply container 23 is opened or closed by means of a servomotor 25.

A control output 22 is provided on the control unit 1 on the outer wall of the control unit housing 3, to which the control means 11 can send a signal (control pulse) for triggering regeneration. In accordance with the invention, this control output 22 is connected with (manual) regeneration triggering on the softening device 2. The control means 11, which knows the capacity consumption of the softening device 2 from the measuring results of the flow meters 12, 13 and the capacity sensor 16, can then trigger regeneration in time prior to depletion of the ion exchange resin when the capacity of the softening device 2 has been programmed. If necessary, the control means 11 itself can empirically determine the capacity of the softening device 2 in accordance with the invention by triggering regeneration (thereby establishing full capacity of the softening device 2) and determining the utilized capacity until the content of hardness components in the blended water rises again (hardness breakthrough determined by the measuring means 17).

The control means 1 furthermore has a measuring input 20 in the outer wall 3 of the control unit housing 3 for a third flow meter 21. The third flow meter 21 is placed outside of the control unit 1 and determines a rinsing water flow $V(t)_{part3rinse}$ produced during regeneration of the softening device 2, also abbreviated as $V(t)_{rinse}$ which is originally branched off from the untreated water that flows to the softening device 2 via the secondary outlet 5. In the indirect determination of the first partial flow $V(t)_{part1soft}$ in the control means 11, this flow is then also considered in accordance with $V(t)_{part1soft} = V(t)_{rawall} - V(t)_{part2raw} - V(t)_{part3rinse}$.

Figure 2:
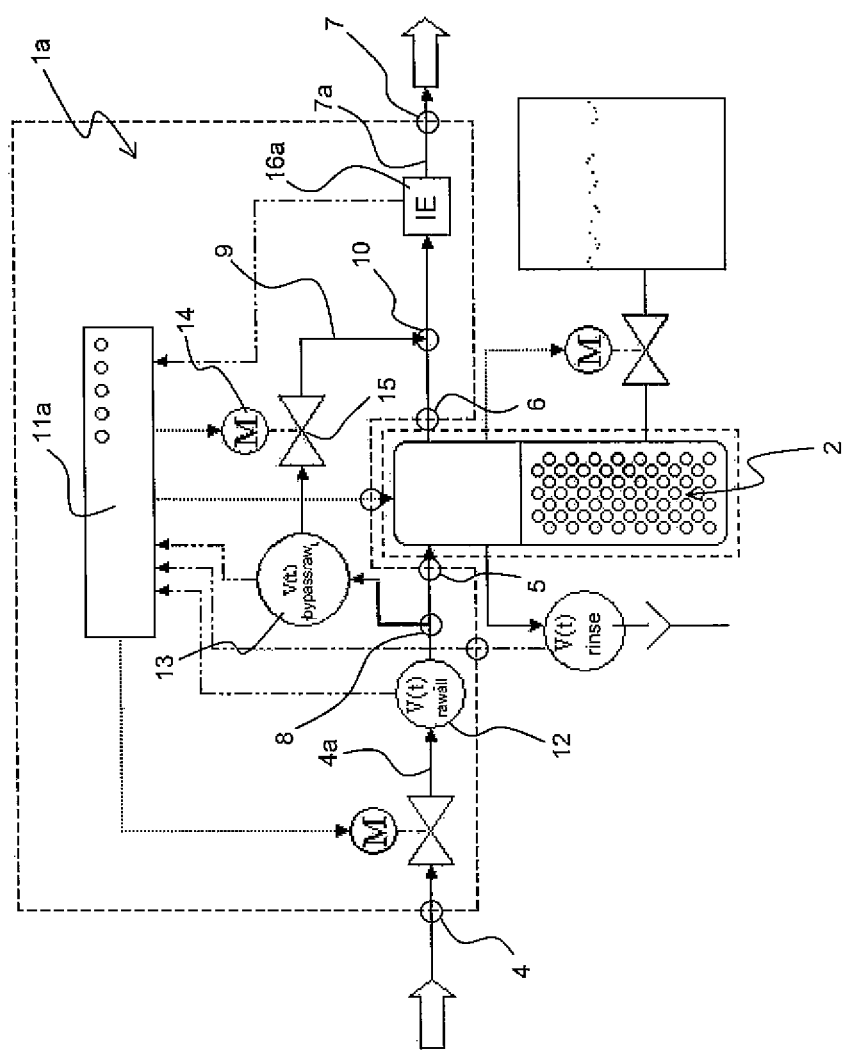
FIG. 2 shows a schematic view of an inventive water softening system with an inventive control unit, with an ion-selective electrode in the blended water area.

FIG. 2 shows an embodiment of an inventive water softening system which is similar to FIG. 1. Only the substantial differences from the embodiment of FIG. 1 are explained below.

The control unit 1a of the water softening system shown in FIG. 2 does not have a conductivity sensor in the line section 4a (between the primary inlet 4 and the branching point 8), but an ion-selective electrode 16a is instead arranged in the line section 7a in the blended water area (between joining point 10 and primary outlet 7). The additional measuring means 20 provided in the embodiment of FIG. 1 is not provided in the embodiment of FIG. 2.

The electronic control means 11a of FIG. 2 determines the first partial flow $V(t)_{part1soft}$ which flows from the softening device 2 via the secondary inlet 6 to the control unit 1a, in an indirect fashion via the overall untreated water flow $V(t)_{rawall}$, which is determined by the first flow meter 12, and the second untreated water-containing partial flow $V(t)_{part2raw}$ in the bypass line 9, which is determined by the second flow meter 13. The blended water hardness determined by the ion-selective electrode 16a is directly compared with the desired value for the blended water hardness, which is stored in the control means 11a, and the automatically adjustable blending means, in the present case in the form of a valve 15 that can be adjusted by the servomotor 14, is correspondingly readjusted. In this embodiment, the flow meters 12, 13 are not required for readjustment of the adjustment position of the blending means (the flow meters 12, 13 can therefore also be omitted in an alternative embodiment). When the desired blended water hardness can only be maintained by a strongly rising portion of the softened partial flow $V(t)_{part1soft}$ (determined via the flow meters 12, 13), this is a sign of an imminent complete depletion of the softening device 2, upon which the control means 11a triggers regeneration.

It should be noted that with direct determination of the water hardness of the blended water, a separate blending means within the softening device 2 does not necessarily need to be shut down but can also provide e.g. a fixed device-internal blending ratio. In this case, the softening device 2 must provide water of a lower hardness as desired in the blended water of the control unit 1a.

The inventive control unit 1, 1a is designed independently of the softening device 2 and can therefore be easily retrofitted, in particular, to an existing softening device 2 that has been previously serially connected to a water line. Towards this end, the control unit 1, is is connected (installed) between the softening device 2 and the water line. The control unit 1, 1a itself provides all functions for automatic blending, in particular, water hardness determination, flow measurements and adjustment of a blending means, and preferably also automated triggering of regeneration. The control unit can therefore be universally used.

The invention claimed is:

1. Control unit for a softening device, wherein the control unit comprises:
   a primary inlet for untreated water;
   a primary outlet for blended water;
   a sensor for determining the water hardness of the untreated water $WH_{raw}$ or the blended water $WH_{blend}$;
   a secondary outlet which is supplied with untreated water from the primary inlet;
   a secondary inlet which is supplied to the primary outlet;
   a bypass line connecting the primary inlet and primary outlet and which is guided parallel to the secondary outlet and the secondary inlet, wherein the bypass line is configured to supply the untreated water from the primary inlet to the primary outlet and wherein the bypass line is disposed internal to a control unit;
   a blender which can be automatically adjusted for mixing a blended water flow $V(t)_{blend}$ from a first partial flow $V(t)_{part1soft}$ of the secondary inlet and a second partial flow $V(t)_{part2raw}$ of the bypass line;
   an electronic control means configured to readjust the adjustment position of the blender according to the determined water hardness $WH_{raw}$ or $WH_{blend}$ in such a fashion that the water hardness in the blended water flow $V(t)_{blend}$ is adjusted to a predetermined desired value; wherein the control unit is designed in the form of an external control unit for the softening device, wherein the control unit has a control unit housing, the outer side of which is provided with the primary inlet, the primary outlet, the secondary outlet and the secondary inlet, and wherein the control unit housing completely contains the sensor, the entirety of the bypass line, the blender and the electronic control means, and wherein the blended water flow $V(t)_{blend}$ is configured to be blended from the first partial flow $V(t)_{part1soft}$ and the second partial flow $V(t)_{part2raw}$ within the control unit housing.

2. Control unit according to claim 1, wherein the sensor is designed as a conductivity sensor.

3. Control unit according to claim 1, wherein the sensor is arranged in the untreated water area of the control unit.

4. Control unit according to claim 1, wherein the control unit housing is designed as an intermediate connecting piece.

5. Control unit according to claim 1, wherein the control unit further comprises at least two flow meters for direct or indirect determination of the partial flows $V(t)_{part1soft}$ and $V(t)_{part2raw}$, that the electronic control means is designed to also readjust the adjustment position of the blender on the basis of the determined partial flows $V(t)_{part1soft}$ and $V(t)_{part2raw}$, and that the control unit housing also contains the at least two flow meters.

6. Control unit according claim 1, further comprising a first flow meter arranged between the primary inlet and the branching point of the bypass line for determining an overall untreated water inflow $V(t)_{rawall}$, and a second flow meter arranged in the bypass line for determining the second partial flow $V(t)_{part2raw}$.

7. Control unit according to claim 6, wherein the control unit has a measuring input for a third flow meter in order that a rinsing water flow $V(t)_{part3rinse}$ can be determined for the electronic control, and that the electronic control is designed to determine the first partial flow $V(t)_{part1soft}$ in accordance with the equation $V(t)_{part1soft}=V(t)_{rawall}-V(t)_{part2raw}-V(t)_{part3rinse}$.

8. Control unit according to claim 1, further comprising a measuring device is arranged in the blended water area in addition to the sensor for determining the concentration of the hardness components calcium and magnesium $C_{hardnessblend}$ in the blended water flow $V(t)_{blend}$.

9. Control unit according to claim 8, wherein the measuring device is designed as titrator for titrimetric determination of the hardness components, or that the measuring device comprises an ion-selective sensor, in particular, an ion-selective electrode.

10. Control unit according to claim 1, further comprising an automatically actuatable stop valve disposed directly downstream of the primary inlet, and that the electronic control is designed to automatically close the stop valve in case of a leakage.

11. Control unit according claim 1 wherein the control unit has a control terminal for triggering regeneration of the softening device, and that the electronic control is designed to determine, in dependence on the soft water withdrawals performed since the last triggered regeneration and on one or more associated defined untreated water hardnesses, a residual capacity of the softening device, and upon depletion thereof, to automatically issue a control pulse to the control terminal for triggering regeneration.

12. Control unit according to claim 11, wherein the sensor is designed as a conductivity sensor for measuring the conductivity of the untreated water $L_{raw}$, and that the electronic control is designed to derive an overall hardness I of the untreated water, which is used to control regeneration triggering, from the measured conductivity $L_{raw}$ by way of a first calibration characteristic, and to derive an overall hardness II of the untreated water, which is used to control the blender, from the measured conductivity $L_{raw}$ by way of a second calibration characteristic.

13. Water softening system comprising a softening device with a softener housing and an external control unit according claim 1, wherein the control unit is disposed outside of the softener housing and wherein the softener device is connected at the secondary outlet and the secondary inlet of the control unit to the outer side of the control unit housing.

14. Water softening system according to claim 13, wherein the water softening system has a supply container for regenerant solution and also means for automatic performance of regeneration of the softening device.

15. Water softening system according to claim 13, wherein the softening device comprises its own softening device blender, and wherein the softening device blender is configured to be closed such that the softening device only provides completely softened water.

16. Water softening system according to claim 14, wherein the means for automatic performance of regeneration of the softening device further comprises a regeneration valve driven by a servomotor, wherein the control terminal is connected to the means for automatic performance of regeneration.

17. A control unit for creating a blended water flow by mixing a softened water flow from a connectable pre-existing water softener with a raw water flow, wherein the control unit comprises:
a control unit housing;
a primary inlet connected to the control unit housing configured to receive the raw water flow;
a primary outlet connected to the control unit housing configured to dispense the blended water flow;
a sensor disposed inside the control unit housing configured for determining a water hardness of the raw water flow or the blended water flow;
a secondary outlet connected to the control unit housing configured to dispense a first portion of the raw water flow to the connectable pre-existing water softener;
a secondary inlet connected to the control unit housing configured to receive a softened water flow from the connectable pre-existing water softener;
a bypass line disposed entirely inside the control unit housing and connected between the primary inlet and primary outlet, the bypass line configured to dispense a second portion of the raw water flow from the primary inlet to the primary outlet;
a blender disposed inside the control unit housing configured to adjust the softened water flow with the raw water flow to then create the blended water flow; and
an electronic control disposed inside the control unit housing configured to receive the water hardness from the sensor and control the blender to dispense the blended water flow at a predetermined water hardness desired value.

* * * * *